(12) United States Patent
Ackermann et al.

(10) Patent No.: US 11,881,739 B2
(45) Date of Patent: Jan. 23, 2024

(54) CONTROL MODULE FOR CONTROLLING A PLURALITY OF POWER SWITCHING ELEMENTS AND A METHOD THEREOF

(71) Applicant: SIGNIFY HOLDING B.V., Eindhoven (NL)

(72) Inventors: Bernd Ackermann, Aachen (DE); Matthias Wendt, Wurselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 81 days.

(21) Appl. No.: 17/771,538

(22) PCT Filed: Oct. 20, 2020

(86) PCT No.: PCT/EP2020/079459
§ 371 (c)(1),
(2) Date: Apr. 25, 2022

(87) PCT Pub. No.: WO2021/083732
PCT Pub. Date: May 6, 2021

(65) Prior Publication Data
US 2022/0376545 A1    Nov. 24, 2022

(30) Foreign Application Priority Data

Oct. 29, 2019   (EP) .................................... 19205796

(51) Int. Cl.
*H02J 9/06*          (2006.01)
*H02J 50/80*         (2016.01)
(Continued)

(52) U.S. Cl.
CPC .............. *H02J 9/06* (2013.01); *H02J 7/0048* (2020.01); *H02J 7/00712* (2020.01); *H02J 50/40* (2016.02); *H02J 50/80* (2016.02)

(58) Field of Classification Search
CPC ........ H02J 9/06; H02J 7/0048; H02J 7/00712; H02J 50/40; H02J 50/80
See application file for complete search history.

(56) References Cited

U.S. PATENT DOCUMENTS

2009/0322160 A1   12/2009   DuBose et al.
2014/0049301 A1   2/2014    Blanken et al.
(Continued)

FOREIGN PATENT DOCUMENTS

JP    H09191569 A      7/1997
JP    2017005938 A     1/2019
(Continued)

*Primary Examiner* — Daniel Cavallari

(57) ABSTRACT

A control module (120,120*a-b*) for controlling a plurality of power switching elements (111*a-d*) arranged for controlling provision of power to one or more wireless network devices (125*a-c*); wherein the control module (120,120*a-b*) comprises a processor (122) arranged for: determining which one of the plurality of power switching elements (111*a-d*) the control module (120,120*a-b*) receives power through; determining a set of the plurality of wireless network devices (125*a-c*) which receives power via a first power switching element out of the plurality of power switching elements (111*a-d*); determining that the set includes all the wireless network devices which receive power via the first power switching element; determining operational state of each of the wireless network devices in the set; determining whether the control module (120,120*a-b*) receives power via the first power switching element; evaluating a first set of conditions; wherein the first set of conditions comprises that the control module (120,120*a-b*) does not receive power via the first power switching element and the determined operational state indicates that each of the wireless network devices in the set does not require power, controlling, based on a positive result of the evaluation of the first set of (Continued)

conditions, the first power switching element to cease power provision to the set of wireless network devices.

14 Claims, 4 Drawing Sheets

(51) Int. Cl.
*H02J 50/40* (2016.01)
*H02J 7/00* (2006.01)

(56) References Cited

U.S. PATENT DOCUMENTS

| | | |
|---|---|---|
| 2017/0344042 A9 | 11/2017 | Davis et al. |
| 2018/0248756 A1 | 8/2018 | Kaag |
| 2018/0248757 A1 | 8/2018 | Kaag |
| 2020/0295597 A1* | 9/2020 | Wootton ........... H02J 13/00007 |

FOREIGN PATENT DOCUMENTS

| | | |
|---|---|---|
| WO | 2017001281 A1 | 1/2017 |
| WO | 2017060138 A1 | 4/2017 |
| WO | 2018001783 A1 | 1/2018 |

* cited by examiner

CONTROL MODULE FOR CONTROLLING A PLURALITY OF POWER SWITCHING ELEMENTS AND A METHOD THEREOF

CROSS-REFERENCE TO PRIOR APPLICATIONS

This application is the U.S. National Phase application under 35 U.S.C. § 371 of International Application No. PCT/EP2020/079459, filed on Oct. 20, 2020, which claims the benefit of European Patent Application No. 19205796.6, filed on Oct. 29, 2019. These applications are hereby incorporated by reference herein.

FIELD OF THE INVENTION

The invention relates to a control module, a system and a method for controlling a plurality of power switching elements; wherein each power switching element is arranged for controlling provision of power to one or more wireless network devices.

BACKGROUND

Smart home systems, formed from smart network devices and home networks, are often connected to Internet such that they may be controlled by a user when (s)he is out-of-home. Although above referred to as a 'home' system, such a system can be implemented in any environment such as a workspace or outdoor space. The smart network devices are devices capable of being connected to, or identified by, the system. An example of such a smart home system is a connected lighting system, which refers to a system of one or more lighting devices which are controlled not by (or not only by) a traditional wired, electrical on-off or dimmer circuit, but rather by using a data communication protocol via a wired network or more often wireless connection, e.g. with a wireless networking protocol such as Zigbee, Wi-Fi or Bluetooth.

Electricity (power) is supplied from the electricity grid to such smart home systems often via a smart meter. Electricity is further distributed from the smart meter to several smart fuse boxes, dedicated to feed electrical circuits each comprising smart network devices and/or control modules. The smart fuse box comprises (several) smart circuit breakers which protect electrical circuits connected to the smart fuse box. A switching (on/off) of a switch incorporated in a smart circuit breaker will connect to/disconnect from the mains power, the electrical circuits protected by this smart circuit breaker.

US 2009/322160 A1 discloses a method and circuit for reducing power consumption of a power strip including two or more outlets and two or more outlet circuits, with AC power input connected to the outlets throught the outlet circuit(s), and a switch. The power strip is configured for reducing or eliminating power during idle mode by disengaging an outlet from power input.

SUMMARY OF THE INVENTION

The inventors have realized that a deadlock situation can occur in such smart home systems when a control module powers itself off. The control module, coupled to an electrical circuit, can turn off a switch which disconnects the electrical circuit from the mains power. The (re)connection of the electrical circuit with the mains power will depend on a signal from the control module which is already powered off. In such a deadlock situation, the control module is unable to perform control operations.

It is therefore an object of the present invention to avoid such deadlock situation so that the control module remains capable of performing control operations which are associated with the control module.

According to a first aspect, the object is achieved by a control module for controlling a plurality of power switching elements, wherein each power switching element is arranged for controlling provision of power to one or more wireless network devices; wherein the control module comprises a processor arranged for: determining which one of the plurality of power switching elements the control module receives power through; determining a set of the plurality of wireless network devices which receives power via a first power switching element; determining that the set includes all the wireless network devices which receive power via the first power switching element; determining operational state of each of the wireless network devices in the set; determining whether the control module receives power via the first power switching element; evaluating a (first) set of conditions; wherein the (first) set of conditions comprises that the control module does not receive power via the first power switching element and the determined operational state indicates that each of the wireless network devices in the set does not require power; controlling, based on (a positive result of) the evaluation (of the first set of conditions), the first power switching element to cease power provision to the set of wireless network devices.

The control module may be arranged for controlling a plurality of power switching elements. Each power switching element may be comprised in a (smart) circuit breaker. A (smart) circuit breaker is an electrical switch, which may be controlled to cease/provide power to one or more wireless network devices and/or to the control module. In an example, the circuit breaker may be designed to protect one or more wireless network devices and/or the control module from damage caused by excess current from an overload or short circuit.

The control module may receive power via any of the power switching element. A processor of the control module may be arranged for determining via which one of the plurality of power switching elements, the control module receives power. The processor may be further arranged for determining a set of the plurality of wireless network devices which receives power via a first power switching element; and further arranged for making sure that the set comprises all the wireless network devices which receive power via the first power switching element. The processor may be further arranged for determining operational state of each of the wireless network devices in the set. Operational state may relate to an operation of a wireless network device. For instance, determining operational states may relate to whether each of the wireless network devices in the set is non-operational such that each device doesn't require power, or each of the wireless network devices in the set is in standby such that each device requires a lower power compared to power required for normal operation.

The processor may be further arranged for determining whether the control module receives power via the first power switching element. This determination may relate to finding whether the control module and the set of wireless network devices receive power via the same power switching element. The ceasing of power provision via the first power switching element to the set of wireless network devices may also cease power provision to the control module and hence makes it unable to perform control operations. The non-operative control module, in such situations, may not be able to control the first power switching element anymore. A deadlock situation is resulted in such situations, since the control of the first power switching element for power provision is expected from the control module which is non-operative. A (first) set of conditions may be evaluated. The (first) set of conditions may comprise that the control module does not receive power via the first power switching element and the determined operational state may indicate that each of the wireless network devices in the set does not require power. Since, the first power switching element is controlled (via the processor) to cease power provision to the respective one or more wireless network devices based on (a positive evaluation of) the evaluation, such deadlock situation is avoided. The ceasing of power provision via the first power switching element may also depend on the determined operational state of the set of wireless network devices, e.g. when the set is non-operational such that each of the wireless network devices in the set doesn't require power, the processor may then control the first power switching element to cease power provision to the set of wireless network devices.

In an embodiment, the processor may be further arranged for determining whether at least one other control module receives power from the first power switching element; and wherein the (first) set of conditions may further comprise that the control module and the at least one other control module do not receive power via the first power switching element.

In this embodiment, a deadlock situation may be created for at least one other control module which receives power via the first power switching element. Therefore, the processor may be arranged for determining whether the at least one other control module receives power via the first power switching element, and if not, then control the first power switching element to cease power provision to the respective one or more wireless network devices. Therefore, the deadlock situation for the at least one other control module is (also) avoided. In this situation, the ceasing of power provision via the first power switching element to the set of wireless network devices may also cease power to the control module and the at least one other control module.

In an embodiment, the processor may be further arranged for, evaluating a second set of conditions, wherein the second set of conditions comprises the control module receives power via the first power switching element and the determined operational state indicates that each of the wireless network devices in the set does not require power, establishing, based on the positive results of the evaluation of the second set of conditions, an auxiliary power path via which the control module can receive power and controlling the first power switching element to cease power provision to the set of wireless network devices, upon establishment of the the auxiliary power path.

When the control module receives power via the first power switching element, and when the power provision via the first power switching element is ceased, the control module is unable to perform control operations associated with the control module. The control operations may comprise controlling the operational states of at least the set of wireless network devices and/or controlling the power switching element(s) to cease/provide power. Therefore, in such cases, the processor may be arranged for first establishing an auxiliary power path via which the control module receives power and then subsequently controlling the first power switching element to cease power provision to the set of wireless network devices. The establishment of the auxiliary power path is advantageously performed to keep the control module capable of performing control operations.

In an embodiment, the auxiliary power path may comprise a power path for receiving power from an energy storage element; wherein power provision from the auxiliary power path may not be controlled via the first power switching element.

The auxiliary power path may comprise a power path for receiving power from an energy storage element. The control module may directly receive power via the auxiliary path such that the power provision is not controlled via the first power switching element. The energy storage element may, for example, be a capacitor, such as an electrolytic capacitor, or supercapacitor, or an array of capacitors and/or batteries. The batteries may be rechargeable such it can be charged, discharged, and recharged at least multiple times. The use of energy storage element provides a simple solution to avoid deadlock situation and keeps the control module capable of performing control operations.

In an embodiment, the processor may be further arranged for determining a charging level of the energy storage element; and wherein the (second) set of conditions may further comprise that the determined charging level is above a threshold.

The charging level of the energy storage element such as a (rechargeable) battery may be determined. The charging level may be, for instance, a State-of-Charge (SoC) of the energy storage element which is the level of charge of an energy storage element relative to its capacity. Usually, SoC cannot be measured directly but it can be estimated from direct measurement variables in two ways: offline and online. The processor may also be arranged for determining if the charging level is above a threshold. The threshold may be determined based, e.g. on power required by the control module. If the charging level is sufficient such that the energy storage element can provide power as required by the control module for performing control operations, the charging level is considered to be above the threshold. Therefore, the set of conditions may comprise that the determined charging level is above a threshold. The control module is then arranged for receiving power from the energy storage element. The processor may be arranged for, after receiving power from the energy storage element, subsequently controlling the first power switching element to cease the power provision to the set of wireless network devices.

In an embodiment, the processor may be further arranged for, on the condition that the determined charging level is below a threshold, controlling the first power switching element to resume providing power to the control module.

When the determined charging level is below a threshold, such that the energy storage element cannot provide power as required by the control module for performing control operations, the processor may be arranged for controlling the first power switching element to resume providing power to the control module. In this embodiment, the control module may be receiving power from the energy storage element and the power provision via the first power switching element is ceased. The processor may periodically or at random times determine the charging level, for instance, during the period when control module is receiving power from the energy storage element. Alternatively, the energy storage element may be arranged for indicating, e.g. by a red/blinking light or by sending a charging signal, the charging level to the processor when the charging level is close to the threshold value.

In an embodiment, the processor may be further arranged for: evaluating a second set of conditions, wherein the second set of conditions comprises that the control module receives power via the first power switching element and the determined operational state indicates that each of the wireless network devices in the set does not require power, assigning, based on the positive results of the evaluation of the second set of conditions, at least one other control module to perform control operations associated with the control module; wherein the control operations may comprise controlling the operational state of at least the set of wireless network devices and/or controlling the plurality of power switching elements and controlling the first power switching element to cease power provision to the set of wireless network devices upon assigning of the at least one other control module to perform control operations associated with the control module.

On the condition that the control module and the set of wireless network devices receive power from the (same) first power switching element, the processor may assign at least one other control module to perform control operations associated with the control module. In an example, the processor may first determine which at least one other control module is able to perform control operations, the processor may determine, for instance, that the at least one other control module is receiving power, the at least one other control module has sufficient processing power and/or memory etc. When the at least one other control module is suitable for the assignment, the processor may be arranged to assign the at least one other control module to perform control operations associated with the control module. In another example, the suitability check is not performed, and the processor may be arranged to assign the at least one other control module to perform control operations associated with the control module. The control operations may comprise controlling the operational state of at least the set of wireless network devices. The control operations may further comprise controlling the plurality of power switching elements. In an example, when the at least one other control module, during the operation, is not able to perform control operations, for instance, that it does not have sufficient remaining processing power to support further control operations, the at least one other control module may be arranged for controlling the first power switching element to resume power provision to the control module or, alternatively, refusing to accept the assignment.

In an embodiment, the control module may further comprise a memory arranged for storing a list of a plurality of other control modules, and for each of the other control modules a list of corresponding power switching elements via which each of the other control modules is arranged for receiving power.

In an example, the control module may further comprise a memory which may be arranged for storing a table of other control modules with their respective power switching elements via which they are arranged for receiving power. Such a table is advantageously stored to know a mapping of different connections in a network, i.e. which other control module receives power from which power switching element.

In an embodiment, the processor may be further arranged for: monitoring which one of the other control modules has been assigned to perform the control operations; monitoring whether power provision via the power switching element corresponding to the assigned other control module is ceased; and on the condition that the power provision is ceased: controlling the power switching element corresponding to the assigned other control module to provide power to the assigned other control module.

In this example, the control module may act as a 'master' control module, which makes sure that the control operations associated with the control module and with the other control modules are successfully performed and there is no deadlock in the network. The processor may be arranged for monitoring which one of the other control modules has been assigned to perform control operations. In case, when the power provision via the power switching element corresponding to the assigned other control module is ceased, the process may be arranged for controlling the corresponding power switching element to provide power (at least) to the assigned other control module. Therefore, the assigned other control module is kept capable of performing control operations and there is no deadlock in the network.

In an embodiment, the processor may be further arranged for: monitoring whether a wireless network device is required to be controlled by at least one other control module; monitoring whether power provision via the power switching element corresponding to the at least one other control module is ceased; and on the condition that the power provision is ceased; controlling the power switching element corresponding to the one other control module to provide power at least to the one other control module.

In case, when a wireless network device is required to be controlled by at least one other control module, e.g. because of a schedule for the wireless network device according to which the wireless network device is required to be controlled, a sensor signal on which the wireless network device is required to react etc. If the power provision via the power switching element corresponding to the at least one other control module is ceased, the processor may advantageously control the corresponding power switching element to provide power (at least) to the one other control module.

In an embodiment, the wireless network devices may be lighting devices and the control module may be arranged for controlling operational state of the lighting devices.

In this embodiment, the wireless network devices may be lighting devices. In an example, the operational states are an ON state in which the lighting devices provide illumination and an OFF state in which the lighting devices do not provide illumination. In another example, the control module may be arranged for controlling one or more of: color, color temperature, intensity, beam width, beam direction, illumination intensity, and/or other parameters of one or more of light sources of the lighting device.

In an embodiment, the plurality of power switching elements is comprised in an electrical distribution board.

The power switching elements may each be comprised in a smart circuit breaker; wherein the plurality of power switching elements may be comprised in an electrical distribution board, e.g. a smart fuse box.

According to a second aspect, the object is achieved by a system for controlling a plurality of power switching elements; comprising: a wireless communication network comprising a plurality of wireless network devices; and a control module according to the first aspect.

According to a third aspect, the object is achieved by a method for controlling a plurality of power switching elements; wherein the method comprises the steps of: determining which one of the plurality of power switching elements, the control module receives power through; determining a set of the plurality of wireless network devices which receives power via a first power switching element; determining that the set includes all the wireless network devices which receive power via the first power switching element; determining operational state of each of the wireless network devices in the set; determining whether the control module receives power via the first power switching element; evaluating a (first) set of conditions; wherein the (first) set of conditions comprises that the control module does not receive power via the first power switching element and the determined operational state indicates that each of the wireless network devices in the set does not require power; controlling, based on (a positive result of) the evaluation, the first power switching element to cease power provision to the set of wireless network devices.

According to a fourth aspect, the object is achieved by a computer program product comprising instructions which, when the program is executed by a computer, cause the computer to carry out the steps of the method according to the third aspect.

According to a fifth aspect, the object is achieved by an electrical distribution board comprising a plurality of power switching elements and a control module according to the first aspect.

It should be understood that the computer program product, method and the system may have similar and/or identical embodiments and advantages as the above-mentioned control module.

BRIEF DESCRIPTION OF THE DRAWINGS

The above, as well as additional objects, features and advantages of the disclosed devices, systems and methods will be better understood through the following illustrative and non-limiting detailed description of embodiments of devices, systems and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
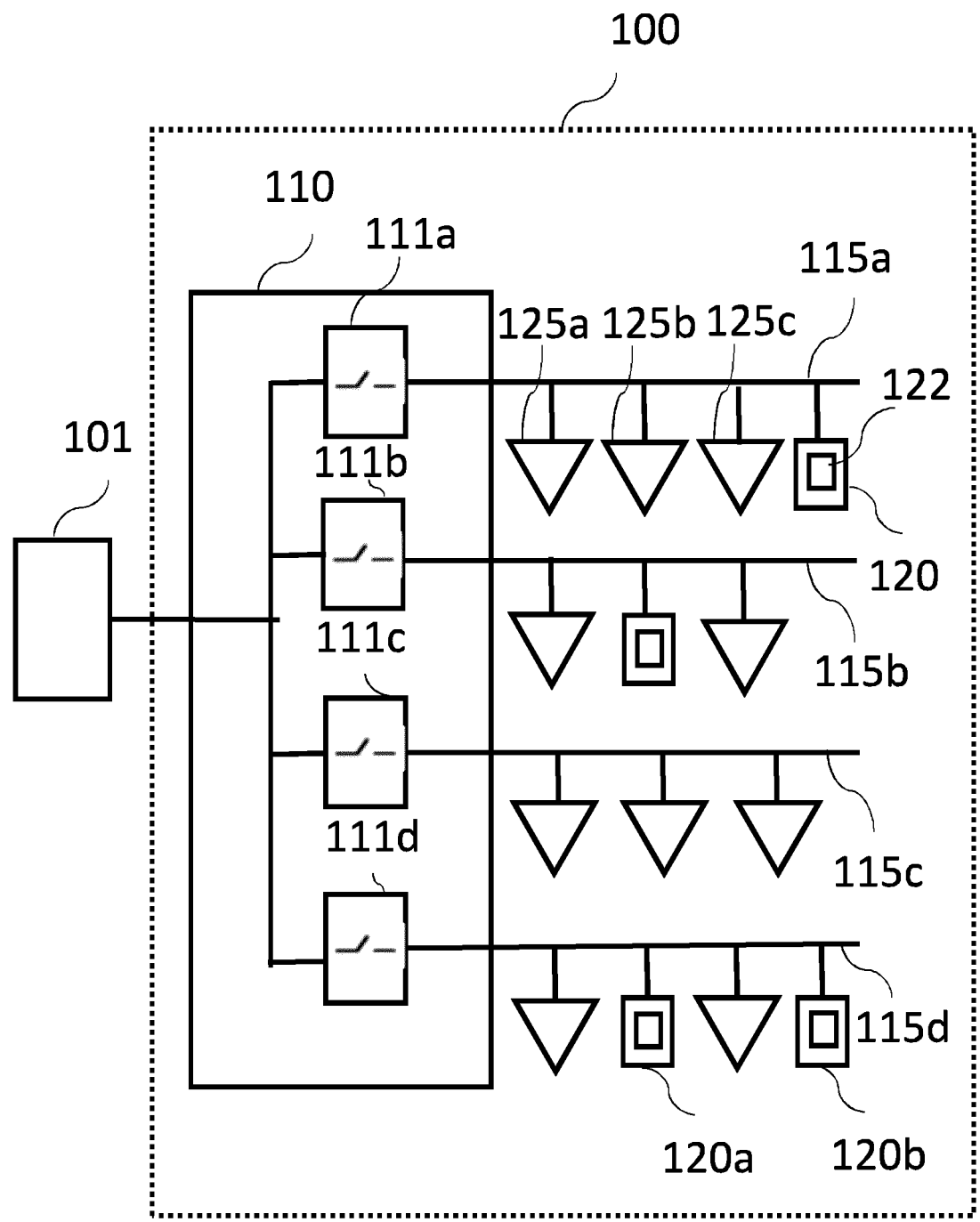
FIG. 1 shows schematically and exemplary an embodiment of a system for controlling a plurality of power switching elements.

FIG. 1 shows schematically and exemplary an embodiment of a system 100 for controlling a plurality of power switching elements 111a-d. Electricity is supplied from an electricity grid (not shown) to the system 100 via a smart meter 101. Electricity is further distributed from the smart meter 101 to several electrical distribution boards. For the sake of clarity of representation, only one of the several electrical distribution boards 110 is shown in FIG. 1. In an example, the electrical distribution board 110 may be a smart fuse box. The system 100 may comprise a plurality of power switching elements 111a-d comprised in the electrical distribution board 110. The electrical distribution board 110 may be arranged for dividing an electrical power feed via the smart meter 101 into four subsidiary power zones or power buses 115a-d each associated to a respective power switching element 111a-d and for providing electrical power to the wireless network devices 125a-c and/or control modules 120, 120a-b coupled to that respective power zone/bus 115a-d.

In the exemplary FIG. 1, the power switching element 111a is arranged for controlling provision of power to the wireless network devices 125a-c coupled to the power zone/bus 115a. Similarly, the power switching element 111b is arranged for controlling provision of power to the wireless network devices (for the sake of clarity of representation, these wireless network devices are not numbered) coupled to the power zone/bus 115b. In the exemplary FIG. 1, the system 100 comprises four power switching elements 111a-d and the four respective power zones/buses 115a-d. The system 100 may comprise any number of power switching elements 111a-d and the respective power zones/power buses 115a-d. Each power switching element 111a-d may be comprised in a (smart) circuit breaker. When the power-switching element 111a-d is in an ON state, the electrical power is provided to the respective power zone/bus 115a-d and thus to the coupled wireless network devices 125a-c, and when the power-switching element 111a-d is in an OFF state, the respective power zone/bus 115a-d and thus the coupled wireless network devices 125a-c, do not receive the electrical power.

The wireless network devices 125a-c may be comprised in a wireless communication network. The wireless communication network may use a protocol of any suitable type, including for example Bluetooth, ZigBee or Wi-Fi. The wireless communication network in general may use any wireless protocol. The wireless communication between the plurality of wireless network devices and the control module may conveniently be by use of ZigBee, Bluetooth and/or Wi-Fi signals, or even using for example infrared (IR) signals. The plurality of wireless network devices may, for example, be connected either in a star network topology or in a mesh network topology.

In an example, the wireless network device 125a-c may be a lighting device. The wireless network device 125a-c may be any device such as a sensing device, an entertainment device such as audio/video device and/or a network gateway etc. Each wireless network device 125a-c may at least comprise a wireless transceiver (not shown) for transmitting/receiving communication signals to and from the control module(s) 120, 120a-b and/or other wireless network devices 125a-c. The wireless network devices 125a-c may further comprise a functional unit, e.g. a lighting device may comprise a light source. The power zone/bus 115a-d may comprise the same type of the wireless network devices 125a-c, e.g. all the devices are lighting devices, or all the devices are sensing devices, or alternatively power zone/bus 115a-d may comprise different types of the wireless network devices 125a-c.

The power zone/bus 115a-d may further comprise control module(s) 120, 120a-b. In an example, the power zone/bus 115a-d may comprise one or more control modules 120, 120a-b. In the exemplary figure, the power zone/bus 115a comprises one control module 120, whereas power zone/bus 115d comprises two other control modules 120a-b. In an example, not each power zone/bus 115a-d comprises a control module. In the exemplary figure, the power zone/bus 115c doesn't comprise control module(s) 120, 120a-b. The power provision to the control module(s) 120, 120a-b coupled to the power zone/bus 115a-d may also be controlled via the respective power switching element 111a-d. Therefore, in an example, when the power switching element 111a is in an OFF state, the control module 120 doesn't receive power. The control operations may comprise controlling the operational states of the wireless network devices 125a-c and/or controlling one or more power switching elements 111a-d to cease/provide power. The control operations may comprise controlling the operational states of some or all of the wireless network devices 125a-c in the set. In such examples, some wireless network devices 125a-c are controlled by the at least one other control module(s).

The control module 120 may comprise a processor 122. The processor 122 may be arranged for determining via which one of the plurality of power switching elements, the control module 120 receives power. In other words, the processor 122 is arranged for determining that the control module 120 is coupled to which power zone/bus 115a-d. In this exemplary figure, the control module 120 is arranged for receiving power via the first power switching element 111a. The processor 122 may be further arranged for determining a set of the plurality of wireless network devices 125a-c which receives power via the first power switching element 111a. In this exemplary figure, the wireless network devices 125a-c receives power via the first power switching element 111a. The processor 122 may further be arranged for determining that the set includes all the wireless network devices 125a-c which receive power via the first power switching element 111a.

The processor 122 may be further arranged for determining operational state of each of the wireless network devices 125a-c in the set. Operational states relate to the operation of the wireless network devices 125a-c, e.g. when the wireless network devices 125a-c may be lighting devices, the operational states may relate to whether the lighting devices are providing illumination (ON-state) or not providing illumination (OFF-state). Operational states may be such that the wireless network devices 125a-c are non-operational such that they don't require power or they are in standby such that they require a lower power compared to power required for normal operation.

The processor 122 may be further arranged for determining whether the control module 120 receives power via the first power switching element 111a. This determination may be performed to explicitly check whether the control module 120 and the set of wireless network devices 125a-c receive power via the same first power switching element 111a. A deadlock situation may occur when the control module 120 also receives power via the first power switching element 111a (as in FIG. 1), so controlling the first power switching element 111a to cease power provision may cause the control module 120 to become unable to perform control operations. Therefore, a (first) set of conditions may be evaluated. The (first) set of conditions may be introduced such that when the control module 120 does not receive power via the first power switching element 111a and based on the determined operational state, for instance, when the set of wireless network devices 125a-c doesn't require power, the processor is then arranged for controlling the first power switching element 111a to cease power provision to the set of wireless network devices 125a-c. Hence, avoiding the deadlock situation.

In an example, the processor 122 may be further arranged for determining whether at least one other control module 120a-b receives power via the first power switching element 111a. This determination relates to determining whether there are more than one control modules 120a-b which receive power via the first power switching element 111a. In the exemplary figure, power zone/bus 115d shows that there are two control modules 120a-b which are arranged for receiving power via the power switching element 111d. Therefore, the first power switching element 111a may be controlled to cease power provision to the set of wireless network devices 125a-c on the condition that the control module 120 and the at least on other control module 120a-b do not receive power via the first power switching element 111a and further based on the determined operational state.

Figure 2:
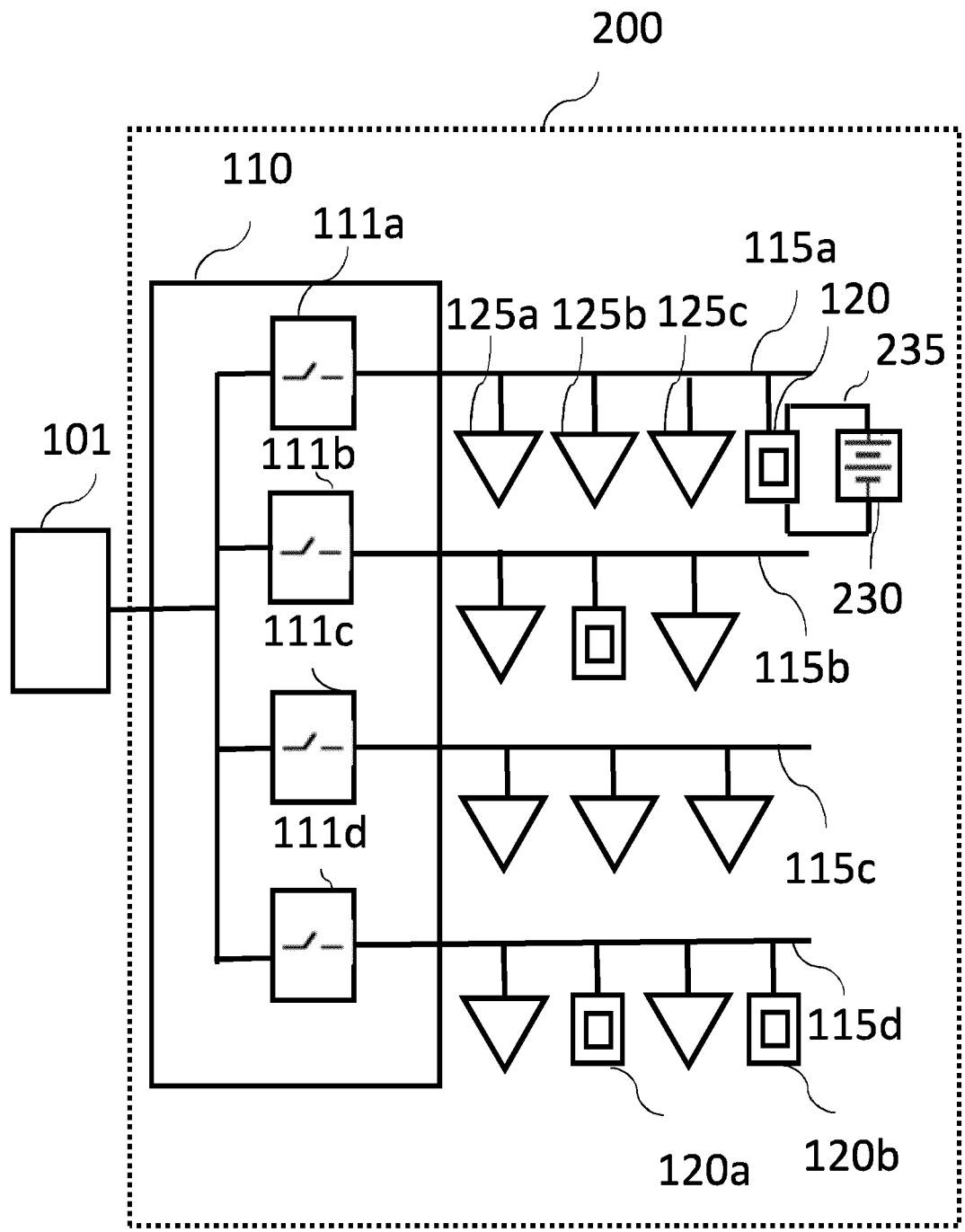
FIG. 2 shows schematically and exemplary another embodiment of a system for controlling a plurality of power switching elements.

FIG. 2 shows schematically and exemplary another embodiment of a system 200 for controlling a plurality of power switching elements 111a-d. The exemplary system 200 is similar to the system 100 as shown in FIG. 1, except for that the control module 120 is connected to an auxiliary power path 235. The processor 122 (not numbered in FIG. 2 due to clarity of representation) may be arranged for, evaluating a second set of conditions, wherein the second set of conditions comprises that the control module 120 receives power via the first power switching element 111a-d and based on the determined operational state, establishing (on a positive evaluation of the second set of conditions) an auxiliary power path 235 via which the control module 120 receives power prior to controlling the first power switching element 111a to cease power provision to the set of wireless network devices 125a-c. In case, when the control module 120 and the set of wireless network devices 125a-c receive power from the (same) first power switching element 111a, controlling the first power switching element 111a to cease power provision will cause the control module 120 to become unable to perform control operations. Therefore, in such cases, the processor 122 may first establish an auxiliary power path 235 via which the control module 120 may receive power prior to controlling the first power switching element 111a to cease power provision.

In an example, the auxiliary power path 235 may comprise a power path 235 for receiving power from an energy storage element 230; wherein power provision from the auxiliary power path is not controlled via the first power switching element 111a. The energy storage element 230 may, for example, be a capacitor, such as an electrolytic capacitor, or supercapacitor, or an array of capacitors and/or batteries. The energy storage element 230, e.g. a battery, may have standardized size and shape, e.g., AA, AAA, C, D, CR123, CR2, and so forth, with a defined standard chemistry, e.g., a carbon zinc, an alkaline, a lead acid, a NiCd, a NiMH, a lithium or a lithium-ion chemistry. The energy storage element 230 may be rechargeable such that a dedicated charging unit (not shown) may be used to charge the energy storage element 230. The capacity of the energy storage element 230 may depend on the power requirements of the control module 120. In an example, when the energy storage element 230 is not rechargeable, it may be replaceable such that the energy storage element 230 is replaced after its life cycle.

The processor 122 may be further arranged for determining a charging level of the energy storage element 230. The processor 122 may use different methods known in the art to determine the charging level, e.g. by determining State-of-Charge (SoC) of the energy storage element 230. The SoC may be determined, for example, by using methods such as coulomb-counting, impedance spectroscopy, hydrometer etc. Any other method known in the art to determine the SoC may be used. The processor 122 may be further arranged for determining whether the determined charging level is above a threshold. The threshold may be based on the energy required by the control module 120 to perform control operations. If the determined charging level is above a threshold, the control module 120 may be arranged for receiving power from the energy storage element 230 via the auxiliary power path. Alternatively, the processor 122 may be further arranged for, if the determined charging level is below the threshold, controlling the first power switching element 111a to resume providing power (at least) to the control module 120. The determination of charging level of the energy storage element 230 may be performed at random time instants. In another example, the determination may be performed when the control module 120 receives power via the first power switching element 111a and on the condition that the determined charging level is above a threshold, the processor 122 may be arranged for controlling the first power switching element 111a to cease power provision to the set of wireless network devices 125a-c and subsequently arranged for receiving power from the energy storage element 230. In another example, the determination of the charging level of the energy storage element 230 may be performed when the control module 120 is not receiving power from the first power switching element 111a and on the condition that the determined charging level is below a threshold, the processor 122 may be arranged for controlling the first power switching 111a element to resume providing power provision at least to the control module 120. In an example, when the control module 120 receives power from the energy storage element 230, the control operations of the control module 120 may be limited.

Additionally, and/or alternatively to receiving power from an energy storage element 230, the processor 122 may be further arranged for, evaluating a second set of conditions, wherein the second set of conditions comprises that the control module 120, receives power via the first power switching element 111a and based on the determined operational state, assigning (based on a positive evaluation of the second set of conditions) at least one other control module 120a-b to perform control operations of the control module 120; wherein the control operations may comprise controlling the operational state of at least the set of wireless network devices 125a-c and/or controlling the plurality of power switching elements 111a-d; and subsequently controlling the first power switching element 111a to cease power provision to the set of wireless network devices 125a-c. In this example, the at least one other control module 120a-b may be arranged for taking over the control operations of the control module 120 prior to the control module 120 becoming unable to perform control operations associated with the control module 120. The control module 120 may assign more than one other control modules 120a-b to perform control operations, e.g. based on the suitability of performing control operations in terms of available processing power, memory etc. The assignment may comprise transferring information about the to-be-controlled set of wireless network devices 125a-c such as network IDs, types etc., and about the power switching element 111a via which control module 120 receives power.

The processor 122 may be further arranged for monitoring which one of the other control modules 120a-b has been assigned to perform control operations. The processor 122 may be arranged for monitoring whether power provision via the power switching element 111a-d corresponding to the other control module 120a-b is ceased, in this exemplary FIG. 1, for the other control module 120a, the corresponding power switching element is 111d. On the condition that the power provision via the corresponding power switching 111a is ceased; the corresponding power switching element 111a may be controlled to provide power at least to the other control module 120a such that the other control module 120a may perform the control operations.

The processor 122 may be further arranged for monitoring whether a wireless network device 125a-c is required to be controlled by at least one other control module 120a-b and for monitoring whether power provision via the power switching element 111a-d to the corresponding at least one other control module 120a-b is ceased. In an example, the wireless network device 125a-c which is required to be controlled and the at least one other control module 120a-b which is arranged for controlling the wireless network device 125a-c, may receive power via the same power switching element 111a-d. In this example, the wireless network device 125a-c may also receive power from an energy storage element (not shown). Therefore, when power provision from the (same) power switching element is ceased, only the at least one other control module 120a-b is unable to perform control operation while the wireless network device 125a-c is able to operate by receiving power from the energy storage element. In an alternate example, the wireless network device 125a-c and the at least one other control module 120a-b receive power via different power switching elements 111a-d. The processor 122 may be further arranged for, on the condition that the power provision via the corresponding power switching 111a-d is ceased, controlling the corresponding power switching element 111a-d to provide power at least to the one other control module 120a-b.

Figure 3:
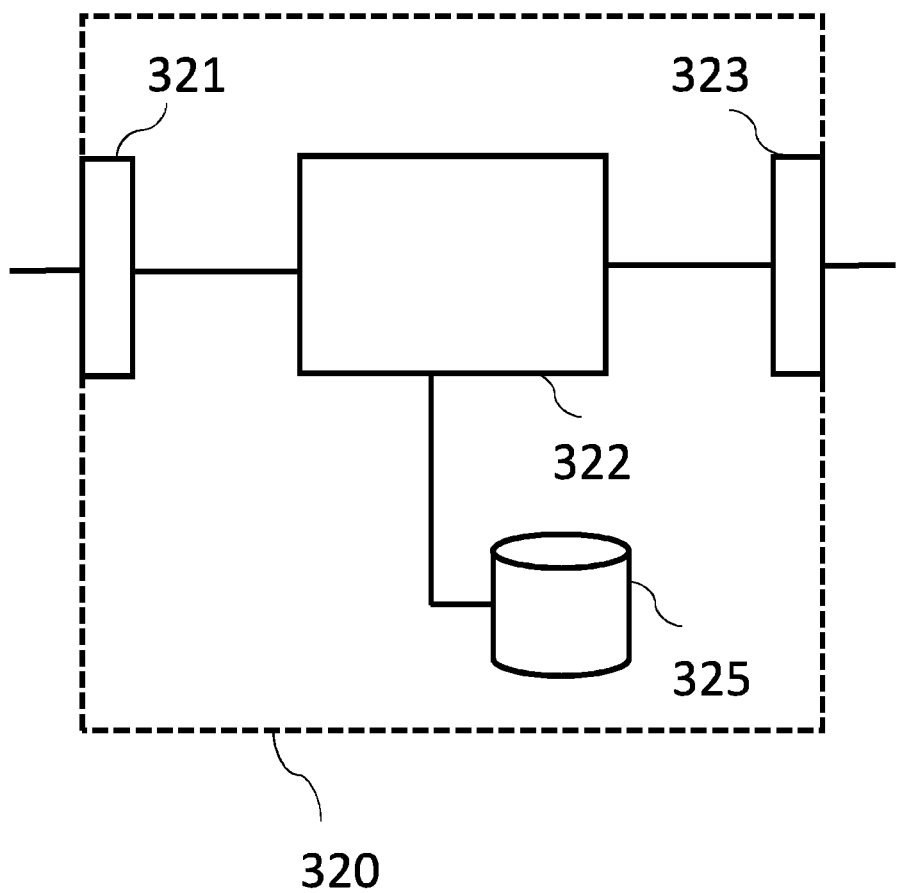
FIG. 3 shows schematically and exemplary an embodiment of a control module for controlling a plurality of power switching elements.

FIG. 3 shows schematically and exemplary an embodiment of a control module 320 for controlling a plurality of power switching elements 111a-d. The control module 320 may comprise a processor 322, for instance, to perform control operations. The control module 320 may further comprise an input unit 321 and an output unit 323. The input 321 and the output 323 units may be comprised in a transceiver (not shown) arranged for receiving (input unit 321) and transmitting (output unit 323) communication and/or control signals. The communication/control signals may be used for communicating with other control modules 120a-b, with the plurality of power switching elements 111a-d and/or at least with the set of wireless network devices 125a-c. The control module 320 may comprise a memory 325, which may be arranged for storing a list of a plurality of other control modules 120a-b, and for each of the other control modules 120a-b a list of corresponding power switching elements 111a-d via which each of the other control modules 120a-b is arranged for receiving power. The memory 325 may be one or more of random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs). The processor 322 may be arranged for retreiving the list from the memory 325.

Figure 4:
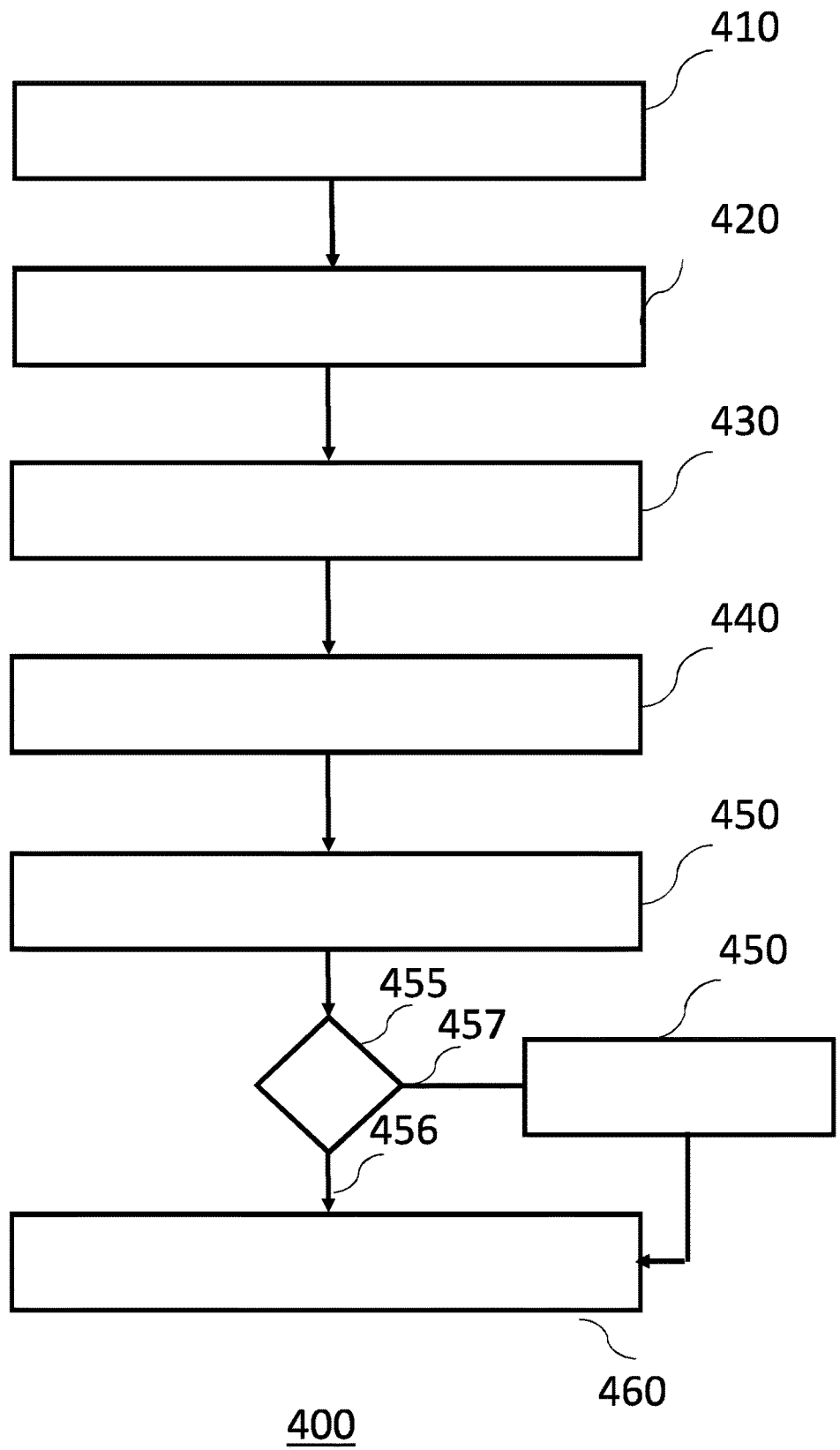
FIG. 4 shows schematically and exemplary a flowchart illustrating an embodiment of a method for controlling a plurality of power switching elements.

FIG. 4 shows schematically and exemplary a flowchart illustrating an embodiment of a method 400 for controlling a plurality of power switching elements 111a-d. The method 400 may comprise the step of determining 410 via which one of the plurality of power switching elements 111a-b, the control module 120, 320 receives power. The method 400 may further comprise the step of determining 420 a set of the plurality of wireless network devices 125a-c which receives power via a first power switching element 111a. The method 400 may further comprise the step of determining 430 that the set includes all the wireless network devices 125a-c which receive power via the first power switching element 111a. The determination 430 may be performed to confirm that the set is complete and there are no other wireless network devices 125a-c, other than included in the set, which also receive power via the first power switching element 111a. Operational state of each of the wireless network devices 125a-c in the set is determined 440. The method 400 may further comprise the step of determining 450 whether the control module 120, 320 receives power via the first power switching element 111a. The determination 450 is a confirmation that the set of wireless network devices 125a-c and the control module 120, 320 receive power via the same power switching element 111a. A set conditions may be evaluated 455 to avoid the deadlock situation such that the control module 120, 320 remains capable of performing control operations which are associated with the control module 120, 320. The set of conditions may comprise, e.g. as a first condition, the operational state of the set of wireless network devices 125a-c. A second condition may be that the control module 120, 320 does not receive power via the first power switching 111a. The processor 122, 322, therefore when these conditions are met (as indicated by 456), may be arranged for controlling 460 the first power switching element 111a to cease power provision to the set of wireless network devices 125a-c. The first power switching element 111a may be controlled 460 to cease power provision to the set of wireless network devices 125a-c when the operational state of the set of wireless network devices 125a-c may be, for instance, such that each device in the set don't require power.

In case, when at least one other control module 120a-b also receives power via the first power switching element 111a, controlling the first power switching element 111a to cease power provision to the set of wireless network devices 125a-c based only on the above evaluation 455, may render the at least one other control module 120a-b not able to perform its control operations. The processor 122, 322 may be arranged for determining whether at least one other control module receives power via the first power switching element 111a.

A third condition may be introduced in the evaluation 455, i.e. the control module 120 and the at least on other control module 120a-b do not receive power via the first power switching element. Based on evaluation 455 of this set of conditions, the first power switching element 111a may be controlled 460 to cease power provision.

When the set of conditions, i.e. the control module 120 and/or the at least one other control module 120a-b do/does not receive power via the first power switching element 111a, is not fulfilled, as indicated by 457 in FIG. 4. The processor 122, 322 may be arranged for establishing 450 an auxiliary power path 235 via which the control module 120 receives power prior to controlling 460 the first power switching element 111a to cease power provision to the set of wireless network devices 125a-c. The establishing 450 may comprise receiving power or activating a path to receive power. The auxiliary power path 235 may comprise a power path for receiving power from an energy storage element 230; wherein power provision from the auxiliary power path 235 is not controlled via the first power switching element 111a.

The method 400 may be executed by computer program code of a computer program product when the computer program product is run on a processing unit of a computing device, such as the processor 122 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A control module for controlling a plurality of power switching elements, each power switching element arranged for controlling provision of power to one or more wireless network devices;
   wherein the control module comprises a processor arranged for:
      determining which one of the plurality of power switching elements the control module receives power through;
      determining a set of the plurality of wireless network devices which receives power via a first power switching element;
      determining that the set includes all the wireless network devices which receive power via the first power switching element;
      determining operational state of each of the wireless network devices in the set;
      determining whether the control module receives power via the first power switching element;
      evaluating a first set of conditions; wherein the first set of conditions comprises that the control module does not receive power via the first power switching element and the determined operational state indicates that each of the wireless network devices in the set does not require power;
      controlling, based on a positive result of the evaluation of the first set of conditions, the first power switching element to cease power provision to the set of wireless network devices.

2. The control module according to claim 1, wherein the processor is further arranged for:

determining whether at least one other control module receives power from the first power switching element; and wherein the first set of conditions further comprises that the control module and the at least one other control module do not receive power via the first power switching element.

3. The control module according to claim 1, wherein the processor is further arranged for, evaluating a second set of conditions, wherein the second set of conditions comprises that the control module receives power via the first power switching element and the determined operational state indicates that each of the wireless network devices in the set does to require power, establishing, based on the positive results of the evaluation of the second set of conditions, an auxiliary power path via which the control module can receive power and controlling the first power switching element to cease power provision to the set of wireless network devices, upon establishment of the auxiliary power path.

4. The control module according to claim 3, wherein the auxiliary power path comprises a power path for receiving power from an energy storage element; wherein power provision from the auxiliary power path is not controlled via the first power switching element.

5. The control module according to claim 4, wherein the processor is further arranged for determining a charging level of the energy storage element; and wherein the second set of conditions further comprises that the determined charging level is above a threshold.

6. The control module according to claim 5, wherein the processor is further arranged for, on the condition that the determined charging level is below a threshold, controlling the first power switching element to resume providing power to the control module.

7. The control module according to claim 1, wherein the processor is further arranged for:

evaluating a second set of conditions, wherein the second set of conditions comprises that the control module receives power via the first power switching element and the determined operational state indicates that each of the wireless network devices in the set does not require power, assigning, based on the positive results of the evaluation of the second set of conditions, at least one other control module to perform control operations associated with the control module; wherein the control operations comprise controlling the operational state of at least the set of wireless network devices and/or controlling the plurality of power switching elements; and controlling the first power switching element to cease power provision to the set of wireless network devices upon assigning of the at least one other control module to perform control operations associated with the control module.

8. The control module according to claim 1, wherein the control module further comprises a memory arranged for storing a list of a plurality of other control modules, and for each of the other control modules a list of corresponding power switching elements via which each of the other control modules is arranged for receiving power.

9. The control module according to claim 8, wherein the processor is further arranged for:

monitoring whether a wireless network device is required to be controlled by at least one other control module;

monitoring whether power provision via the power switching element corresponding to the at least one other control module is ceased; and on the condition that the power provision is ceased;

controlling the power switching element corresponding to the one other control module to provide power at least to the one other control module.

10. The control module according to claim 1, wherein the wireless network devices are lighting devices and the control module is arranged for controlling operational state of the lighting devices.

11. An electrical distribution board comprising a plurality of power switching elements and a control module according to claim 1.

12. A system for controlling a plurality of power switching elements;

comprising:

a wireless communication network comprising a plurality of wireless network devices;

a control module according to claim 1.

13. A method for controlling a plurality of power switching elements; wherein the method comprises the steps of:

determining which one of the plurality of power switching elements, the control module receives power through;

determining a set of the plurality of wireless network devices which receives power via a first power switching element;

determining that the set includes all the wireless network devices which receive power via the first power switching element;

determining operational state of each of the wireless network devices in the set;

determining whether the control module receives power via the first power switching element;

evaluating a first set of conditions; wherein the first set of conditions comprises that the control module does not receive power via the first power switching element and the determined operational state indicates that each of the wireless network devices in the set does not require power;

controlling, based on a positive result of the evaluation, the first power switching element to cease power provision to the set of wireless network devices.

14. A non-transitory computer readable medium comprising instructions which, when the instructions are executed by a computer, cause the computer to carry out the steps of the method of claim 13.

* * * * *